Dec. 31, 1968 C. E. HEWSON Re. 26,511

HEART AND LUNG RESUSCITATOR

Original Filed May 1, 1963

INVENTOR.
CARL E. HEWSON
BY
Ezekiel Wolf, Wolf & Greenfield
ATTORNEYS

United States Patent Office

Re. 26,511
Reissued Dec. 31, 1968

26,511
HEART AND LUNG RESUSCITATOR

Carl E. Hewson, Marshfield, Mass.
(90 Myrtle St., North Quincy, Mass. 02171)

Original No. 3,307,541, dated Mar. 7, 1967, Ser. No. 277,169, May 1, 1963. Application for reissue Aug. 23, 1967, Ser. No. 669,342
16 Claims. (Cl. 128—145.8)

Matter enclosed in heavy brackets [ ] appears in the original patent but forms no part of this reissue specification; matter printed in italics indicates the additions made by reissue.

*ABSTRACT OF THE DISCLOSURE*

*A heart-lung resuscitator having a duct and fitting adapted to be connected to a source of lung ventilating gas for introducing the gas into the lungs of a patient and a cardiac compressor mounted on the chest for applying a mechanical compression to the heart of a patient. Drive means operated by the lung ventilating gas are connected to the duct and fitting and the cardiac compressor for cyclically activating each in timed relationship with one another.*

This invention relates to heart-lung resuscitation.

One important object of this invention is to provide a small, self contained, portable and completely automatic heart-lung resuscitator.

Another important object of this invention is to provide a lung resuscitator unit which supplies a precise volume of oxygen per cycle, which volume may be varied in accordance with the needs of the particular patient.

Another important object of this invention is to provide an automatic heat resuscitation unit which can apply variable amounts of external cardiac compression.

Yet another important object of this invention is to provide a heart-lung resuscitator which assures that the application of oxygen to the lungs is interposed between cardiac compressions.

And still another important object of this invention is to provide a heart-lung resuscitation unit which can be used while the patient is being transported.

To accomplish these and other objects, the heart-lung resuscitation unit of this invention includes among its important features the use of pneumatic activation of the cardiac compressor and the lung ventilator of the device. A pair of cyclically operated valves control the flow of oxygen from a portable source to a lung ventilator tube and a cardiac compressor tube so that the timed operative relationship between the two valves is constant. The valve controlling the flow of oxygen to the lung ventilator opens between successive openings of the other valve to avoid the compressor acting in opposition to the lung ventilator. Regulating valves are disposed between the oxygen source and the two tubes to control the volume of oxygen introduced to the ventilating tube with each cycle of its valve and the load applied by the compressor.

These and other objects and features of this invention will be better understood and appreciated from the following detailed description of one embodiment thereof, selected for purposes of illustration and shown in the accompanying drawing, in which.

Figure 1:
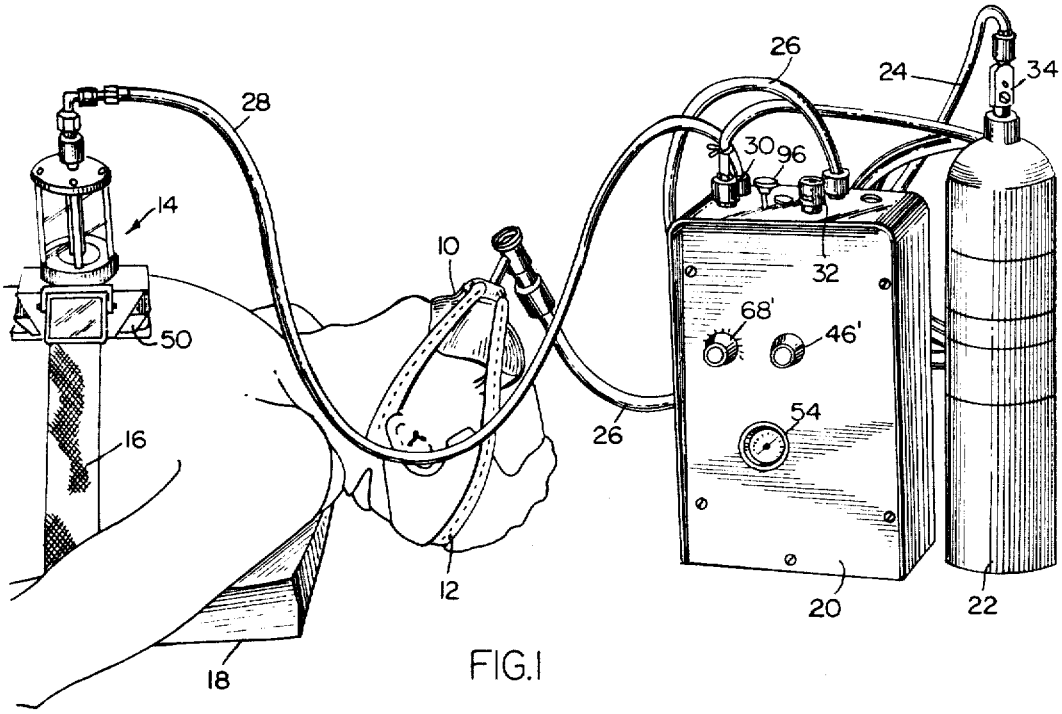
FIG. 1 is a perspective view of the heart-lung resuscitation unit of this invention in use.

A patient is shown in FIG. 1 undergoing treatment with the heart-lung resuscitation unit of this invention. The patient is shown wearing a face mask 10 that covers his nose and mouth, which mask is secured in place by means of straps 12 that extend about the head, and a cardiac compressor cylinder 14 is shown attached by straps 16 to the chest of the patient above the heart. The patient's shoulders rest on a tapered block 18 and his head is dropped back over the thicker side of the block to fully open the airway. While the block 18 per se forms no part of this invention, its use or the use of an equivalent device to open the airway is essential for proper lung ventilation whether administered automatically by a specially designed unit or by direct mouth-to-mouth resuscitation.

Most of the part of the resuscitation unit of FIG. 1 are housed in a case 20, and an oxygen bottle 22 is shown disposed beside the case 20 and connected to it by hose 24. The hose 24 shown in FIG. 1 connecting the oxygen bottle to the case 20 is long and is coiled around several times so that the bottle may be located at some remote place with respect to the case 20 and the patient if desired or convenient for any reason. A second hose 26 is shown in FIG. 1 to join the mask 10 to the case, and a third hose 28 connects the cardiac compressor cylinder 14 to the case 20.

Figure 2:
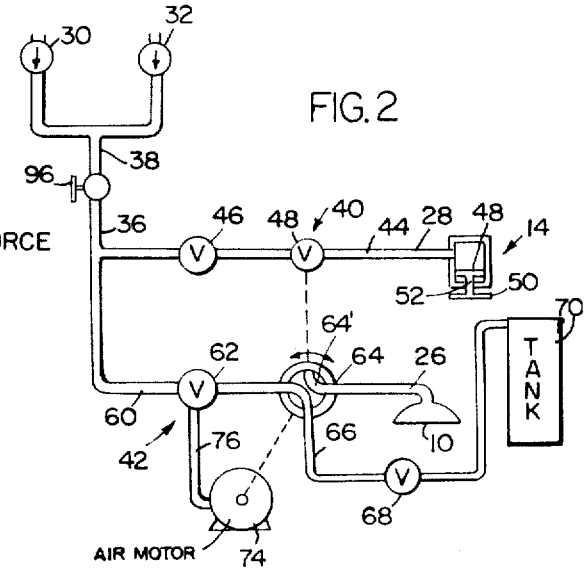
FIG. 2 is a diagrammatic view of the operative assembly of the unit shown in FIG. 1.

In FIG. 2 the assembly within the case 20 is shown diagrammatically. A pair of check valves 30 and 32 are each designed to be connected to an oxygen bottle so that a continuous supply of oxygen may be provided the system. In FIG. 1 the bottle 22 is shown connected by means of hose 24 to the check valve 30, and when the gage 34 on the bottle 22 indicates that the bottle is nearly empty a full bottle may be connected to the unit by means of the second check valve 32. The check valves 30 and 32 are joined to the manifold 36 by T-fitting 38, and the manifold 36 supplies oxygen to the cardiac compressor sub-assembly 40 and the lung ventilating sub-assembly 42.

The cardiac compressor cylinder 14 is disposed at the end of hose 28 in turn connected to the end of conduit 44 which is interrupted by a pressure regulating valve 46 and an on-off valve 48. The pressure regulating valve 46 controls the amount of pressure applied to the cylinder 14 above the piston 48 so as to control the force applied to the chest of the patient by the padded head 50 on the end of the piston rod 52. The pressure regulating valve 46 is controlled by knob 46' on the front panel of the case 20. A gage 54 also mounted on the front of the case 20 forms part of the regulating valve 46 and may be calibrated to indicate the pressure load applied to the patient by the head 50 of the cardiac compression cylinder.

The lung ventilating sub-assembly 42 includes a duct 60 connected at one end to the manifold 36, and it is interrupted by a second pressure regulator valve 62. A two-positioned valve 64 joins the ends of the duct 60 and hose 26 connected to the face mask 10. The valve 64 in one position connects the duct 60 with a line 66 which contains a third regulator 68 and which terminates in a tank 70. In its second position (when the valve 64 is turned counterclockwise 90° from the position shown in FIG. 2) the valve joins the line 66 with the hose 26 which terminates at the face mask 10. Thus, in the position shown in FIG. 2 the valve 64 permits the tank 70 to be charged with oxygen from the bottle 22, and in its second position the valve allows the tank 70 to discharge its contents to the face mask 10.

The regulator valve 68 controls the volume of oxygen supplied to the tank 70 by regulating the pressure under which the oxygen may be stored in the tank. This regulator is provided wtih a control knob 68' on the front panel of the case 20 and thus constitutes a lung volume adjustment. The more oxygen in the tank 70, the more oxygen will be discharged through the mask 10 to the lungs of the patient. The desired volume of oxygen will vary with the individual patient. An adult patient requiring lung ventilation may receive up to approximately 1500 cubic centimeters per breath, while an infant requiring ventilation may receive but a small fraction of that amount.

The system shown in FIG. 2 is completed by an air motor 74 which is connected to the regulator valve 62 by line 76. The air motor 74 is operatively connected to and controls the operation of the valves 48 and 64 in the cardiac compression sub-assembly 40 and the lung ventilating sub-assembly 42 respectively. The motor may be connected to the valves by any conventional linkage. If the valves 48 and 64 are of the spool type, a cam and follower may be used to join the air motor 74, which itself is of conventional design, to the stems of the valves. The regulator valve 62 conserves oxygen and stabilizes the speed of the motor 74. Once set, the regulator 62 ordinarily does not require adjustment and no control knob or similar actuating device is provided on the panel of the case.

Figure 3:
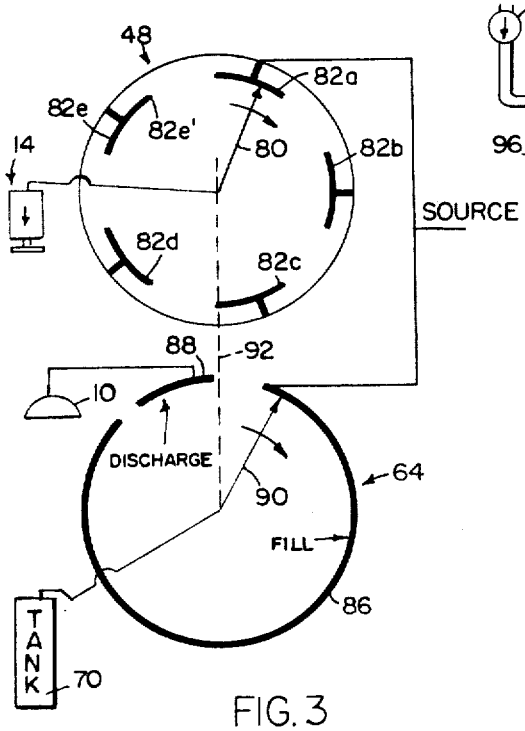
FIG. 3 is a timing diagram of the valves forming a part of the unit shown in FIGS. 1 and 2.

In FIG. 3 the time relationship between the operation of valves 48 and 64 is illustrated. The heavy lines in valve 48 designate oxygen sources, and one revolution of the radial hand 80 occurs during each cycle of the resuscitator. In the position shown, the hand 80 is in communication with oxygen source 82a and thus pressure is applied from the oxygen source to the cardiac compression cylinder 14. When the hand 80 passes off the oxygen source band 82a the cylinder 14 is no longer in communication with the oxygen source, and the elasticity of the body of the patient will restore the piston to its elevated position and exhaust the oxygen in the cylinder. A bleed may be provided in the valve 48 for this purpose. Continued rotation of the hand 80 will place it in contact with the oxygen source 82b, 82c, 82d and 82e to complete one cycle of the machine. Thus, during each cycle of the resuscitation unit five sub-cycles occur during each of which a compressive load is applied to the patient's heart.

In FIG. 3 the valve 64 is shown diagrammatically to include a band 86 in turn connected to the oxygen source and a smaller band 88 connected to the mask 10. A sweep hand 90 is shown to be connected to the tank 70. When the hand 90 is in contact with the band 86 oxygen is supplied from the main source (the oxygen bottle 22) to the tank 70, and when the hand 90 contacts the smaller band 88 the contents of the tank 70 is discharged to the mask. It will be noted in FIG. 3 that the period of discharge represented by band 88 extends over an arc during which time the valve 48 is closed; that is, the hand 90 engages the band 88 at the same time that the hand 80 leaves the trailing edge 82e' of band 82e representing a portion of the cycle of valve 48. Thus, the tank 70 supplies oxygen to the mask 10 only when the pressure is relieved in the cardiac compressor cylinder 14 so that the two do not act against each other. It will also be noted that the tank 70 ceases to discharge its contents through the mask 10 at the very time that the band 82a of valve 48 is placed in communication with the cylinder 14. FIG. 3 suggests that the two valves move together as the sweep hands 80 are tied together by a mechanical coupling represented by the dotted line 92. It will be appreciated that the hand 90 in contact with the band 88 represents the position of the valve 64 when it is turned counterclockwise 90° from the position shown in FIG. 2. It will also be appreciated that actuation of valve 48 will occur five times during each cycle of the air motor 74.

Many different types of valves and actuating motors may be employed in the system. Thus the valves may be either reciprocal or rotary, and the motor may be battery operated as opposed to being air driven. It is however very desirable that the motor be of the variety which may be employed in the filed where no power source is readily available. When the unit is wholly self-contained it may be used at any location or in transit when a patient is being moved from one location to another without regard to the availability of an established power source.

As indicated above, the plate 18 provides the necessary shoulder lift by placing the head in the position for maximum air opening. The strap 16 may be secured to the edges of the plate to assure use of the plate each time the resuscitator is employed. In FIG. 1 the head 50 of the cylinder 14 is shown to be padded to prevent bruising of the body when pressure is applied. The valve 64 may be provided with a bleed as suggested by the passage 64' in FIG. 2 to allow the lungs to exhaust the oxygen when the mask 10 is disconnected from the tank 70. An on and off switch 96 is shown in FIG. 1 mounted on the case 20. The switch 96 may be in the form of a master valve in the manifold 36, which prevents the flow of oxygen from the bottle 22 to the sub-assemblies 40 and 42.

From the foregoing description those skilled in the art will appreciate that the unit shown provides automatic heart-lung resuscitation by means of mechanical external cardiac compression and mechanical lung ventilation. While the lung ventilation is achieved in the embodiment shown by means of a mask 10 which fits over the mouth and nose of the patient, it is to be understood that the mask 10 may be replaced by a fitting to engage an endotracheal tube when conditions require the lungs be inflated in that manner. The unit is small, compact, portable and self-contained and operates automatically to free the attendant for other rescue work. It is also possible to use either the ventilation phase or the compression phase of the unit wtihout the other. This may be accomplished by closing either of the regulating valves 46 or 68 in the subassemblies 40 and 42, respectively. Because the unit has two check valves oxygen bottles may be changed without interrupting the ventilation or compression action of the resuscitator. The unit allows for variable amounts of lung ventilation and cardiac compression, and dials are provided on the face of the case to facilitate the selection of the desired quantities. The rate of compression may be set at sixty per minute, and the rate of ventilation which is one-fifth that of compression or twelve per minute with ventilation interposed between compressions.

The unit has many advantages over direct mouth-to-mouth resuscitation and manual external cardiac compression. For example, the unit shown provides pure oxygen for ventilation. Furthermore, the patient can be transported during use while this is not possible with direct resuscitation or compression. Moreover, during prolonged use, human variability is replaced by mechanical constancy and reliability of ventilation and compression. As another advantage, the unit shown can be used and monitored by one rescuer, while manual mouth-to-mouth resuscitation and external cardiac compression on a single patient requires two rescuers. These advantages are obviously of considerable importance in the important work performed by such devices.

Those skilled in the art will appreciate the numerous modifications that may be made of this invention without departing from its spirit. Therefore, it is not intended that the breadth of this invention be limited to the single embodiment illustrated and described. Rather, it is intended that the breadth of this invention be determined by the appended claims and their equivalents.

What is claimed is:

1. A heart-lung resuscitator comprising
a pair of valves connected to an oxygen source,
means including a hose connected to the outlet of one of the valves for directing oxygen discharged from the valve to the lungs of a patient,
means including a hose and cylinder connected to the outlet of the other of the valves for applying a compressive load to the chest of the patient,
and drive means operatively connected to both of the valves causing them to open and close in timed relationship to one another and with the opening of said one valve occurring when the other of the valves is closed.

2. A heart-lung resuscitator comprising an oxygen source, a pair of cyclically operating valves operated by the oxygen source and with one of the valves cycling approximately five times the rate of the other valve and with the opening of said other valve occurring when the one valve is closed, means connecting the oxygen source with the inlets of the valves causing the valves to pass oxygen when they open, a hose connected to the outlet of said other valve and adapted to direct the oxygen passed by said other valve to the lungs of a patient, means connected to said other valve for controlling the volume of oxygen discharged through that valve during each cycle, and means connected to the outlet of the one valve for applying compressive force to the heart of the patient each time said one valve opens.

3. A heart-lung resuscitator as described in claim 2 further characterized by means connected between the oxygen source and the last recited means for varying the pressure applied to the heart of the patient.

4. A heart-lung resuscitator as described in claim 2 further characterized by means forming part of the volume controlling means for varying the volume of oxygen discharged during each cycle of said other valve.

5. A heart-lung resuscitator comprising an inlet duct, a pair of check valves in the inlet duct for connecting an oxygen source to the duct, a pair of pressure regulators each receiving oxygen from the duct, oxygen lines connected to each of the regulators and having valves controlling the flow of oxygen through each, an air motor connected to the outlet of one of the regulators and forming a path parallel to the line connected to the same regulator, means connecting the motor to each of the valves for controlling the operation of each of said valves and limiting the period during which one of the valves is open to the closed period of the other valve, an oxygen operated pressure applicator connected to the end of one of the lines for applying pressure to the heart of the patient, and means connected to the end of the other of the lines for directing air to the lungs of the patient.

6. A heart-lung resuscitator comprising an inlet duct, a pair of check valves in the inlet duct for connecting an oxygen source to the duct, a pair of pressure regulators each receiving oxygen from the duct, oxygen lines connected to each of the regulators and having valves controlling the flow of oxygen through each, means including a motor connected to each of the valves for controlling the operation of each of said valves and confining the open period of one of the valves to the closed period of the other valve, an oxygen operated pressure applicator connected to the end of one of the lines for applying pressure to the heart of a patient, and means connected to the end of the other of the lines for directing air to the lungs of the patient.

7. A heart-lung resuscitator comprising an inlet duct, means for connecting an oxygen source to the duct, a pair of parallel lines each connected to and receiving oxygen from the duct, a pressure regulator and control valve disposed in each of the lines, means connected to the end of one of the lines and responsive to the pressure of the oxygen passed through that line for applying external cardiac compression to a patient, a tank and a fitting connected by parallel passages to the outlet of the valve in the other of the lines, said fitting enabling oxygen to be introduced into the lungs of a patient, a pressure regulator disposed in the passage of the tank for varying the volume of oxygen which may be directed into the tank through the valve in said other line, and motor means connected to the valves for opening and closing the valve in said one line and sequentially connecting the tank to said other line and the tank to the fitting, the connection between the tank and fitting being made when the valve in said one line is closed.

8. A heart-lung resuscitator as described in claim 7 further characterized by said motor means opening and closing the valve in said one line at approximately 60 cycles per minute and connecting the tank to said other line and the tank to the fitting at approximately 12 cycles per minute.

9. A heart-lung resuscitator as described in claim 8 further characterized by said motor means being an air motor and being connected to and operated by oxygen source through the regulator in said other line.

10. A heart-lung resuscitator as described in claim 7 further characterized by manual control knobs connected to the regulator in the one line and the regulator in the passage of the tank for varying the cardiac compression applied to and the volume of oxygen supplied to the lungs of the patient.

11. A heart-lung resuscitator comprising, means including a duct and fitting adapted to be connected to a source of lung ventilating gas for introducing the gas into the lungs, means adapted to be mounted on the chest for applying a mechanical compression to the heart of a patient, and means driven by the lung ventilating gas operatively connected to the first named means and the last named means for intermittently activating the first named means and the last named means with activation of the first named means occurring during deactivation of said last named means.

12. A heart-lung resuscitator comprising, means including a duct and fitting adapted to be connected to a source of ventilating gas for introducing the gas into the lungs of a patient, means including a pneumatically driven actuator operatively connected to the first named means for cyclically activating and deactivating the said first named means for intermittently directing gas to the lungs, a shoulder lift adapted to be disposed beneath a patient lying on his back for raising the chest and dropping the head back to open the airway of the patient, a fixture for applying pressure to the heart, means for holding the fixture in a selected relationship with respect to the patient, and pneumatically driven means operatively connected to the fixture for cyclically activating and deactivating the fixture in timed relation to the first named means for causing deactivation of the fixture during the time when gas is introduced into the lungs.

13. A heart-lung resuscitator comprising, means including a duct and fitting adapted to be connected to a source of oxygen for introducing oxygen into the lungs of a patient, additional means for applying a mechanical compressive load to the heart of the patient, means encircling the chest of a patient and orienting the additional means in a fixed position with respect to the patient, drive means connected to the additional means for intermittently activating said additional means, and pneumatic control means operatively connected to the means including a duct and fitting for activating the means including a duct and fitting during selected periods of deactivation of said additional means.

14. A heart-lung resuscitator comprsing means including a duct and fitting adapted to be connected to an oxygen source for introducing oxygen into the lungs of a patient, volume controlling means secured to the first named means for controlling the volume of oxygen directed to the patient's lungs, pneumatically actuated means for applying a compressive load to the chest of a patient, a shoulder lift adapted to support the shoulders of a patient with the patient's head back to open the airways, strap means secured to the shoulder lift and the pneumatically actuated means for orienting said means in a fixed position with respect to the chest of a patient disposed on the lift, and means connected to the oxygen source and driven by the oxygen and operatively connected to the first named means and to the pneumatically actuated means and intermittently activating the first named means and the pneumatically actuated means with actuation of said first named means occuring during every fifth deactivation of the pneumatically actuated means.

*15. A lung ventilating assembly comprising*

*a duct and fitting for introducing lung ventilating gas to a patient,*

*a fixed volume tank for metering the volume of lung ventilating gas and connected to the duct,*

*means for introducing lung ventilating gas into the tank,*

*pressure regulating means operatively associated with the last named means for conrtolling the pressure in the tank to achieve a selected volume of lung ventilating gas in the tank,*

*valve means in the duct for connecting and disconnecting the tank and the fitting,*

*and automatic recycling means alternately opening the valve means for discharging the gas in the tank to the lung and activating the means for introducing ventilating gas to the tank so that no gas is introduced into the tank during the time the tank discharges its gas into the lungs,*

*said valve means in the duct allowing the difference of pressure in the tank and the lungs to cause the volume of the gas in the tank to discharge into the lungs of the patient without the aid of mechanical actuation.*

*16. A lung ventilating assembly as defined in claim 15 further characterized by*

*said ventilating gas being oxygen.*

References Cited

The following references, cited by the Examiner, are of record in the patented file of this patent or the original patent.

UNITED STATES PATENTS

| | | | |
|---|---|---|---|
| Re. 25,871 | 10/1965 | Andreasen | 128—145.8 |
| 2,121,311 | 6/1938 | Anderson et al. | 128—145.8 |
| 2,399,643 | 5/1946 | Kreiselman | 128—145.7 |
| 3,045,668 | 7/1962 | Lee | 128—145.5 |
| 3,191,596 | 6/1965 | Bird et al. | 128—145.5 |

CHARLES F. ROSENBAUM, *Primary Examiner.*

U.S. Cl. X.R.

128—53